US012586169B2

(12) United States Patent
Takei et al.

(10) Patent No.: US 12,586,169 B2
(45) Date of Patent: Mar. 24, 2026

(54) MASS IMAGE PROCESSING APPARATUS AND METHOD

(71) Applicant: JEOL Ltd., Tokyo (JP)

(72) Inventors: Masahiko Takei, Tokyo (JP); Takaya Satoh, Tokyo (JP)

(73) Assignee: JEOL Ltd., Tokyo (JP)

( * ) Notice: Subject to any disclaimer, the term of this patent is extended or adjusted under 35 U.S.C. 154(b) by 372 days.

(21) Appl. No.: 18/198,440

(22) Filed: May 17, 2023

(65) Prior Publication Data

US 2023/0377116 A1      Nov. 23, 2023

(30) Foreign Application Priority Data

May 23, 2022    (JP) ................................. 2022-084053

(51) Int. Cl.
| | |
|---|---|
| *G06V 10/60* | (2022.01) |
| *G06T 3/40* | (2006.01) |
| *G06T 5/77* | (2024.01) |
| *G06T 7/00* | (2017.01) |
| *H01J 49/26* | (2006.01) |

(52) U.S. Cl.
CPC .............. G06T 7/0002 (2013.01); G06T 3/40 (2013.01); G06T 5/77 (2024.01); G06V 10/60 (2022.01); H01J 49/26 (2013.01); *G06T 2207/10061* (2013.01)

(58) Field of Classification Search
CPC .......... G06T 7/0002; G06T 3/40; G06T 5/77; G06T 2207/10061; G06V 10/60; H01J 49/26; H01J 49/0036; H01J 49/0004; G06N 3/0464; G06N 3/09
See application file for complete search history.

(56) References Cited

U.S. PATENT DOCUMENTS

| | | | |
|---|---|---|---|
| 2012/0278037 A1* | 11/2012 | Matsuura ................ | G06F 15/00 |
| | | | 702/173 |
| 2018/0330511 A1* | 11/2018 | Ha .......................... | G06F 30/00 |
| 2018/0349759 A1* | 12/2018 | Isogawa ................ | G06N 3/045 |

(Continued)

FOREIGN PATENT DOCUMENTS

| | | |
|---|---|---|
| JP | 2018206382 A | 12/2018 |
| JP | 6962863 B2 | 11/2021 |
| WO | 2020031851 A1 | 2/2020 |

OTHER PUBLICATIONS

Uematsu et al., Noise reduction of live image in scanning electron microscope, Partial Translation of Article from The 33rd Annual Conference of the Japanese Society for Artificial Intelligence, 2019, pp. 1-6.

(Continued)

*Primary Examiner* — Henok Shiferaw
*Assistant Examiner* — Woo C Rhim
(74) *Attorney, Agent, or Firm* — The Webb Law Firm

(57) ABSTRACT
A pre-processor applies a pre-process to an original mass image produced through mass spectrometry of a sample, to produce a model input image. An image quality converter has an image quality conversion model produced through machine learning based on a group of images produced by a scanning electron microscope, and produces a model output image through image quality conversion of the model input image. A post-processor applies a post-process to the model output image, to produce a mass image after image quality conversion.

8 Claims, 9 Drawing Sheets

(56) References Cited

U.S. PATENT DOCUMENTS

| | | | | |
|---|---|---|---|---|
| 2019/0206665 A1* | 7/2019 | Cleland | ............... | G01N 27/623 |
| 2019/0228956 A1* | 7/2019 | Satoh | .................... | H01J 49/027 |
| 2019/0362189 A1* | 11/2019 | Uematsu | ................... | G06T 5/60 |
| 2020/0279408 A1* | 9/2020 | Osoekawa | ............. | G01N 30/86 |
| 2021/0065849 A1* | 3/2021 | Uematsu | ................ | G16C 20/20 |
| 2021/0133989 A1* | 5/2021 | Bhattacharyya | ....... | G06N 3/047 |
| 2021/0150277 A1* | 5/2021 | Kamon | .................. | G06V 10/87 |
| 2021/0390694 A1* | 12/2021 | Mao | .......................... | G06T 5/70 |
| 2022/0059331 A1* | 2/2022 | Yamaguchi | ............ | G06V 10/56 |
| 2023/0013887 A1* | 1/2023 | Ito | ............................. | G06T 5/60 |
| 2023/0078488 A1* | 3/2023 | Dean | ........................ | G16B 5/00 703/11 |
| 2023/0117621 A1* | 4/2023 | Isogawa | ................. | G06N 3/048 382/156 |
| 2023/0377116 A1* | 11/2023 | Takei | .................. | H01J 49/0004 |
| 2024/0265508 A1* | 8/2024 | Onishi | ...................... | G06T 5/60 |
| 2025/0124570 A1* | 4/2025 | Sirbulescu | ............. | G06V 10/80 |

OTHER PUBLICATIONS

Extended European Search Report issued in EP23173222.3 on Oct. 24, 2023.

Scupakova et al., A patch-based super resolution algorithm for improving image resolution in clinical mass spectrometry, Scientific Reports, Feb. 2019, No. 9, vol. 2915, pp. 1-11.

De Haan et al., Resolution enhancement in scanning electron microscopy using deep learning, Scientific Reports, Aug. 2019, No. 9, vol. 12050, pp. 1-7.

Liao et al., A super-resolution strategy for mass spectrometry imaging via transfer learning, Nature Machine Intelligence, Jun. 2023, vol. 5, pp. 656-668.

* cited by examiner

Figure 3:
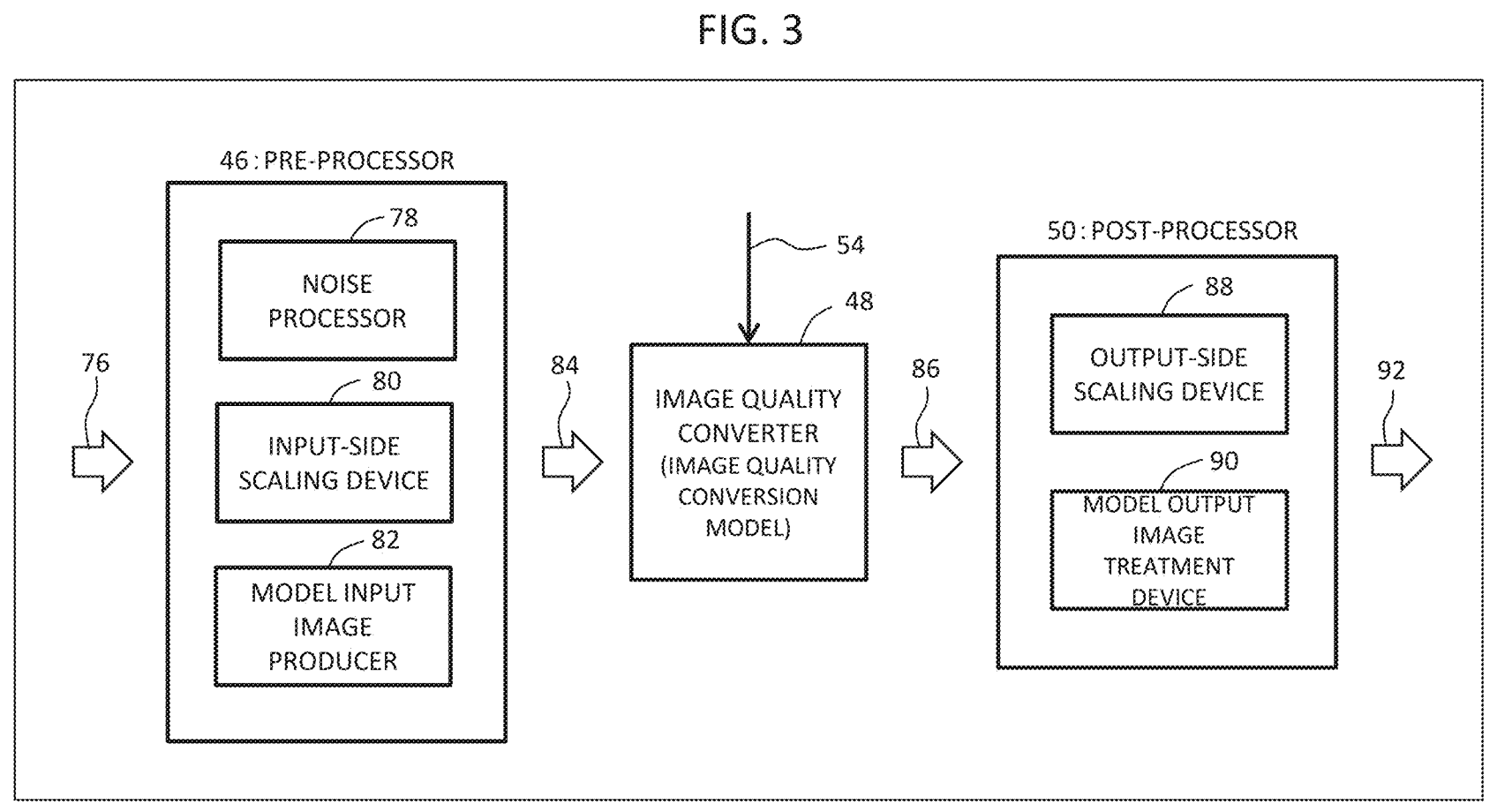

46: PRE-PROCESSOR

78 — NOISE PROCESSOR

80 — INPUT-SIDE SCALING DEVICE

82 — MODEL INPUT IMAGE PRODUCER

76

84

48 — IMAGE QUALITY CONVERTER (IMAGE QUALITY CONVERSION MODEL)

54

86

50: POST-PROCESSOR

88 — OUTPUT-SIDE SCALING DEVICE

90 — MODEL OUTPUT IMAGE TREATMENT DEVICE

POST-PROCESSOR

48A

IMAGE QUALITY CONVERTER
(IMAGE QUALITY CONVERSION MODEL)

a
b b

46

PRE-PROCESSOR

MASS IMAGE PROCESSING APPARATUS AND METHOD

CROSS REFERENCE TO RELATED APPLICATION

This application claims priority to Japanese Patent Application No. 2022-084053 filed May 23, 2022, the disclosure of which is hereby incorporated by reference in its entirety.

BACKGROUND OF THE DISCLOSURE

Field of the Disclosure

The present disclosure relates to a mass image processing apparatus and method of processing a mass image, and in particular to a technique for improving image quality of a mass image.

Description of Related Art

For producing a mass image, first, a plurality of mass spectra are acquired from a plurality of micro areas forming an observation area which is set for a sample. Next, from the plurality of mass spectra, a plurality of ionic strength values (ionic intensities) corresponding to a particular mass-to-charge ratio (m/z) are extracted, and a mass image is produced through two-dimensional mapping of the ionic strength values. According to the mass image, for example, a two-dimensional distribution of a particular element can be visualized. Normally, a plurality of mass images corresponding to a plurality of mass-to-charge ratios are produced based on the plurality of mass spectra as described above.

An amount of ions acquired from each micro area within the observation area is very small. As such, it is difficult to realize a superior S/N ratio when producing the mass image. In general, the mass image is a rough image including a large amount of noise. If a simple smoothing filter is applied to the mass image in order to make the noise or roughness in the mass image less prominent, the entirety of the mass image itself is blurred.

In recent years, there have arisen image quality improvement techniques which use a machine learning model. For example, in the field of electron microscopes, preparing a large number of high-definition images as a large number of ground truth image is in general easy. An image quality conversion model may be produced through machine learning using these high-definition images. On the other hand, in the field of mass images, preparing a large number of high-definition images is in general very difficult, because the amount of ions for each mass-to-charge ratio acquired from each micro area is very small. In the field of mass images, it is difficult to produce an image quality conversion model through supervised machine learning.

Document 1 (JP 2018-206382 A) and Document 2 (WO 2020/031851) disclose an image processing using a machine learning model. Document 3 (JP 6962863 B) discloses a scanning electron microscope having a machine learning model. Document 4 (Uematsu et al., "Noise reduction of live image in scanning electron microscope", the 33rd Annual Conference of the Japanese Society for Artificial Intelligence, 2019) discloses a technique for improving image quality of a scanning electron microscope image using an image quality conversion model.

Documents 1 to 4 do not disclose a technique for improving the image quality of the mass image using a machine learning model.

An advantage of the present disclosure lies in improvement of the image quality of the mass image. Alternatively, an advantage of the present disclosure lies in improvement of the image quality of the mass image using a machine learning model under a situation where a high-definition mass image cannot be acquired.

SUMMARY OF THE DISCLOSURE

According to one aspect of the present disclosure, there is provided a mass image processing apparatus comprising: a pre-processor that applies a pre-process to an original mass image produced through mass spectrometry of a sample, to produce a model input image; a converter that has an image quality conversion model produced through machine learning based on a group of images produced through sample analysis different from the mass spectrometry, and that produces a model output image through image quality conversion of the model input image; and a post-processor that applies a post process to the model output image, to produce a mass image after image quality conversion, wherein the pre-process is a process to fit the model input image with respect to an input condition of the converter, and the post-process is a process to fit the mass image after the image quality conversion with respect to a mass image output condition.

According to another aspect of the present disclosure, there is provided a method of processing a mass image, the method comprising: applying a pre-process to an original mass image produced through mass spectrometry of a sample, to produce a model input image; producing a model output image from the model input image using an image quality conversion model produced through machine learning based on a group of images produced through sample analysis different from the mass spectrometry; and applying a post-process to the model output image, to produce a mass image after image quality conversion, wherein the pre-process is a process to fit the model input image with respect to an input condition of the image quality conversion model, and the post-process is a process to fit the mass image after the image quality conversion with respect to a mass image output condition.

According to another aspect of the present disclosure, there is provided a program for executing a mass image process in an image processing apparatus, the program comprising the functions to: apply a pre-process to an original mass image produced through mass spectrometry of a sample, to produce a model input image; produce a model output image from the model input image using an image quality conversion model produced through machine learning based on a group of images produced through sample analysis different from the mass spectrometry; and apply a post-process to the model output image, to produce a mass image after image quality conversion, wherein the pre-process is a process to fit the model input image with respect to an input condition of the image quality conversion model, and the post-process is a process to fit the mass image after the image quality conversion with respect to a mass image output condition.

BRIEF DESCRIPTION OF THE DRAWINGS

Embodiment(s) of the present disclosure will be described based on the following figures, wherein:

FIG. 1 is a block diagram showing a system according to an embodiment of the present disclosure;

FIG. 2 is a diagram showing production of a mass image;

FIG. 3 is a diagram showing relevant portions of a mass image processing apparatus;

FIG. 6 is a diagram showing a first example of an input-side image manipulation and an output-side image manipulation;

FIG. 7 is a diagram showing a second example of the input-side image manipulation and the output-side image manipulation;

FIG. 11 is a diagram showing an alternative configuration.

DESCRIPTION OF NON-LIMITING EMBODIMENTS OF THE DISCLOSURE

Figures 4, 5:
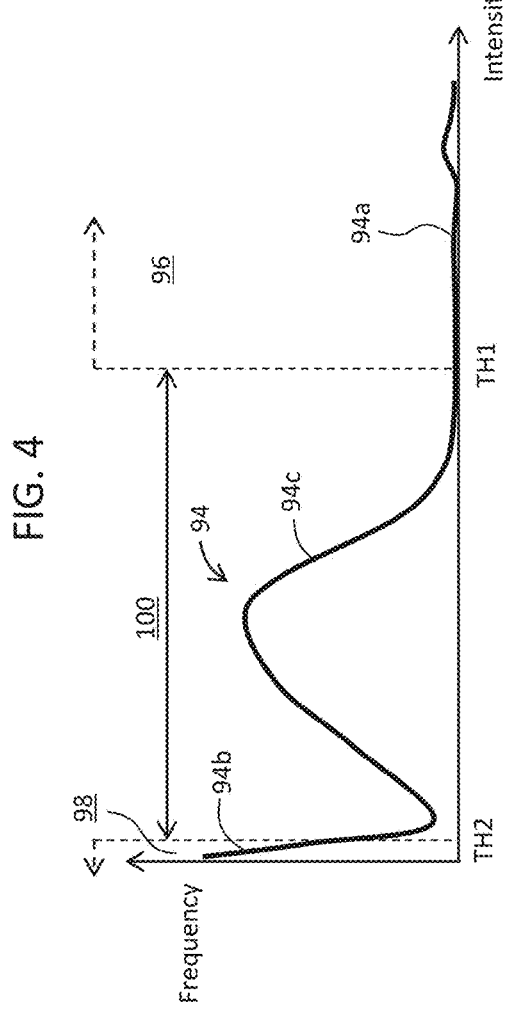
FIG. 4 is a diagram showing an intensity distribution of an original mass image.
FIG. 5 is a diagram showing a plurality of intensity conversions which are stepwise executed.

An embodiment of the present disclosure will now be described with reference to the drawings.

(1) Overview of Embodiment

A mass image processing apparatus according to an embodiment of the present disclosure comprises a pre-processor, a converter, and a post-processor. The pre-processor applies a pre-process to an original mass image produced through mass spectrometry of a sample, to produce a model input image. The converter has an image quality conversion model produced through machine learning based on a group of images produced through sample analysis different from the mass spectrometry, and produces a model output image through image quality conversion of the model input image. The post-processor applies a post-process to the model output image, to produce a mass image after image quality conversion. The pre-process is a process to fit the model input image with respect to an input condition of the converter. The post-process is a process to fit the mass image after the image quality conversion with respect to a mass image output condition. An example of the converter is an image quality converter to be described below.

According to the above-described structure, it becomes possible to use an image quality conversion model in the field of mass images, in which preparation of high-definition images as ground truth images is difficult. In general, a scheme to introduce an image quality conversion model produced in a first field to a second field is also called "transfer learning." The above-described structure includes a pre-process and a post-process, and differs from simple transfer learning. With the pre-process, the model input image can be fitted with respect to the input condition of the converter (or the image quality conversion model), and, therefore, the image quality conversion model can be caused to correctly function. With the post-process, the mass image after the image quality conversion can be fitted to the mass image output condition, and, therefore, a specification of the mass image to be finally output may be set to a desired specification. When a plurality of conversions are executed in the pre-process, a plurality of inverse conversions corresponding to the plurality of conversions may be executed in the post-process.

In an embodiment of the present disclosure, the input condition of the image quality conversion model includes an intensity condition. The pre-process includes intensity scaling to fit an intensity distribution of the original mass image to the intensity condition. With this configuration, the image quality conversion model can be caused to correctly function, or an input dynamic range of the image quality conversion model can be sufficiently utilized. The intensity scaling means manipulation of an intensity distribution range or standardization of the intensity distribution.

In an embodiment of the present disclosure, the pre-process further includes a high intensity noise process to correct or remove a pixel value which satisfies a high intensity condition in the original mass image. The pre-processor executes the intensity scaling after execution of the high intensity noise process. In an embodiment of the present disclosure, the pre-process further includes a low intensity noise process to correct or remove a pixel value which satisfies a low intensity condition in the original mass image. The pre-processor executes the intensity scaling after execution of the high intensity noise process and the low intensity noise process.

In production of the mass image, two-dimensional ion beam scanning or two-dimensional laser scanning is executed with respect to the sample, and a series of ions generated in the scanning process is analyzed through mass spectrometry. During the scanning process, the amount of ions may suddenly vary. More specifically, a rapid increase or rapid decrease of the amount of ions may occur. These variations cause a high intensity noise and a low intensity noise in the mass image. If the intensity scaling is applied to the mass image including these noises, it becomes difficult to cause the image quality conversion model to sufficiently function. Thus, in the above-described configuration, prior to the intensity scaling, the high intensity noise process and the low intensity noise process with respect to the mass image are executed. Afterwards, the intensity scaling is applied to the proper intensity distribution. With this process, it becomes possible to sufficiently utilize the input dynamic range of the intensity conversion model. In general, the high intensity noise forms an obstruction in observing the mass image. Therefore, generally, of the high intensity noise process and the low intensity noise process, at least the high intensity noise process is executed.

In an embodiment of the present disclosure, the input condition of the converter includes a first intensity condition and a first image size condition. The mass image output condition includes a second intensity condition and a second image size condition. The pre-process includes input-side intensity scaling to fit the intensity distribution of the original mass image with respect to the first intensity condition, and an input-side image manipulation to produce the model input image including an entirety or a part of the original mass image such that the first image size condition is satisfied. The post-process includes output-side intensity scaling to fit an intensity distribution of the model output image with respect to the second intensity condition, and an output-side image manipulation to produce the mass image after the image quality conversion including an entirety or a part of the model output image such that the second image size condition is satisfied.

The image quality conversion model used in an embodiment of the present disclosure depends on an intensity distribution of an image produced by another sample analysis and an image size. In other words, the image quality conversion model does not necessarily fit to the intensity distribution and the image size of the mass image. A means for compensating for or removing such a misfit is the pre-process and the post-process. Generally, the pre-process is an indispensable process or an important process for causing the image quality conversion model to correctly function, and the post-process is an indispensable process or an important process for observing the mass image after the image quality conversion.

In an embodiment of the present disclosure, the original mass image is an image produced through ion beam scanning or laser scanning with respect to the sample. The different sample analysis is sample observation by a scanning electron microscope. The group of images are produced by the scanning electron microscope. Each of the scanning electron microscope image and the mass image is a two-dimensional scan image representing a sample surface. There is a similarity or commonness between these two images. Effectiveness of transfer of the machine learning model from the field of the scanning electron microscope images to the field of mass images has been confirmed through experiments by the present inventors. Alternatively, an image quality conversion model produced through machine learning based on other groups of images representing a surface of an object (such as, for example, a group of shape measurement images and a group of optical images) may be applied to the mass image.

Relearning of the image quality conversion model may be executed using the mass image after the image quality conversion. In this case, a part of the image quality conversion model may be set as a turning target.

According to another aspect of the present disclosure, there is provided a method of processing a mass image, comprising a pre-process step, a conversion step, and a post-process step. In the pre-process step, a pre-process is applied to an original mass image produced through mass spectrometry of a sample, to produce a model input image. In the conversion step, a model output image is produced from the model input image using an image quality conversion model produced through machine learning based on a group of images produced through sample analysis different from the mass spectrometry. In the post-process step, a post-process is applied to the model output image, to produce a mass image after image quality conversion. The pre-process is a process to fit the model input image with respect to an input condition of the image quality conversion model. The post-process is a process to fit the mass image after the image quality conversion with respect to a mass image output condition.

The method of processing the mass image described above is realized as a function of hardware or as a function of software. In the latter case, a program for executing the method of processing the mass image is installed on an image processing apparatus via a network or via a transportable recording medium. The image processing apparatus has a non-transitory recording medium which stores the program. The concept of the "information processing apparatus" encompasses a computer, an image processing apparatus, a mass spectrometry system, and the like.

(2) Details of Embodiment

Figure 1:
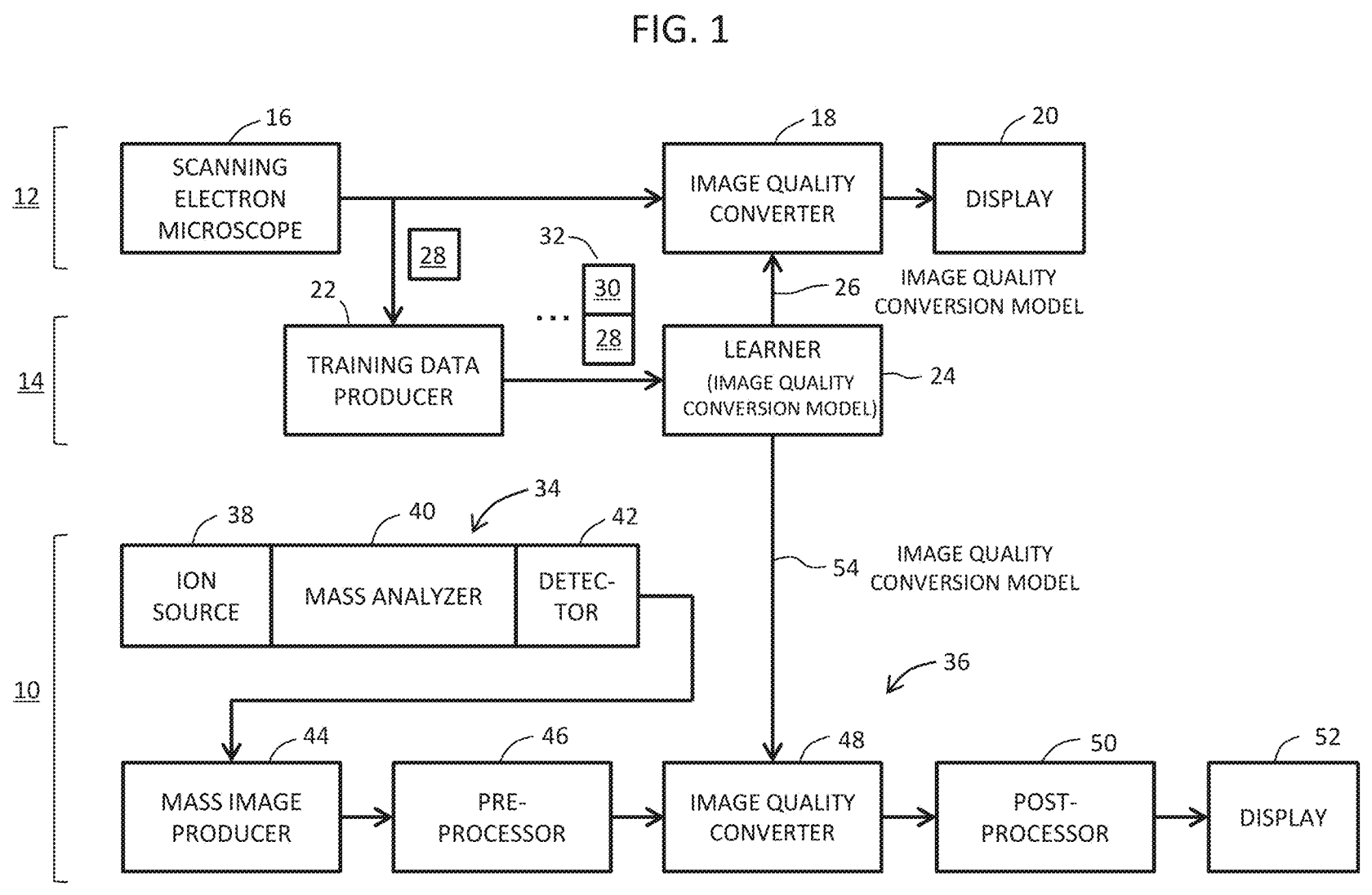

FIG. 1 shows a system according to an embodiment of the present disclosure. The illustrated system includes a mass spectrometry system 10, a scanning electron microscope system 12, and an image quality conversion model producing apparatus 14. The mass spectrometry system 10 is formed from a mass spectrometry apparatus 34 and a mass image processing apparatus 36.

The scanning electron microscope system 12 has a scanning electron microscope 16, an image quality converter 18, and a display 20. The scanning electron microscope 16 has irradiation equipment for irradiating a sample with an electron beam, a detector which detects electrons emitted from the sample, and the like. The irradiation equipment has a function to two-dimensionally scan the electron beam over the sample. The detector is, for example, a secondary electron detector. Examples of other detectors include a backscattered electron detector, an X-ray detector, and the like. A scanning electron microscope image (SEM image) is produced based on an output signal of the detector. The SEM image is more specifically a secondary electron image.

The image quality converter 18 has an image quality conversion model which converts (more specifically, improves) image quality of the SEM image. The image quality converter 18 is formed from, for example, a CNN (Convolutional Neural Network). The actual substance of the image quality conversion model is a set of parameters produced through machine learning. The image quality converter 18 is constructed on a computer different from that of the scanning electron microscope 16, but alternatively, the image quality converter 18 may be incorporated in the scanning electron microscope 16 (more specifically, an information processor thereof). The display 20 displays the SEM image after the image quality conversion. The display 20 is formed from, for example, an LCD (Liquid Crystal Display).

The image quality conversion model producing apparatus 14 is formed from a computer or the like, and has a training data producer 22 and a learner 24. The training data producer 22 produces a noise-containing SEM image 30 by adding artificial noise to an SEM image 28 of high definition. An image pair formed from the noise-containing SEM image 30 and the corresponding high-definition SEM image 28 forms one set of training data 32. In this case, the high-definition SEM image 28 functions as a ground truth image. The training data producer 22 produces a large number of sets of training data 32 based on a large number of SEM images 28. Alternatively, the training data 32 may be produced based on an SEM image acquired from an SEM image database.

The learner 24 is formed from, for example, the CNN. A large number of sets of training data 32 are supplied to the learner 24, and, during this process, for each set of training data 32, the set of parameters in the learner 24 is improved so that the result of the image quality conversion of the noise-containing SEM image 30 becomes closer to the high-definition SEM image 28. Through such a machine learning process, the image quality conversion model is constructed in the learner 24. An image quality conversion model 26 which is produced is supplied to the image quality converter 18. Alternatively, the image quality converter 18 and the learner 24 may be integrated. As the image quality converter 18 and the learner 24, various structures may be employed. Example structures for the image quality converter 18 and the learner 24 are disclosed in Document 4 described above.

Next, the mass spectrometry system 10 will be described. The mass spectrometry apparatus 34 has an ion source 38, a mass analyzer 40, and a detector 42. Examples of the ion source 38 include an ion source following secondary ion mass spectrometry (SIMS), an ion source following matrix-assisted laser desorption-ionization mass spectrometry (MALDI-MS), and the like. In the ion source following the SIMS, the sample source is irradiated with a primary ion beam, and secondary ions emitted from the sample surface are sent to the mass analyzer 40. In the ion source following the MALDI-MS, laser is radiated onto the sample surface, and ions emitted from the sample surface are sent to the mass analyzer 40.

More specifically, an observation area is set on the sample surface, and scanning of the primary ion beam or the laser over the observation area is executed. The observation area is formed from a plurality of micro areas which are two-dimensionally arranged, and ions emitted from each micro area are directed to the mass analyzer 40.

The mass analyzer 40 is formed from a time-of-flight type mass spectrometer, a quadrupole-type mass spectrometer, or the like, and analyzes mass (more accurately, a mass-to-charge ratio) of each individual ion. In the detector 42, ions passing through the mass analyzer are detected. A mass spectrum is produced based on an output signal of the detector 42. More specifically, the mass spectrum is produced for each micro area. A mass spectrum array is formed from a plurality of mass spectra acquired from the plurality of micro areas forming the observation area. FIG. 1 does not show a mass spectrum producer, but the mass spectrum producer is provided in the mass spectrometry apparatus 34 or in the mass image processing apparatus 36.

The mass image processing apparatus 36 has a mass image producer 44, a pre-processor 46, an image quality converter 48, a post-processor 50, a display 52, and the like. The mass image processing apparatus 36 is formed from, for example, a computer. A processor which executes a program (for example, a CPU) functions as the pre-processor 46, the image quality converter 48, and the post-processor 50. Alternatively, the mass image processing apparatus 36 may be incorporated in the mass spectrometry apparatus 34.

The mass image producer 44 extracts a plurality of ionic strengths (an ionic strength array) corresponding to a designated mass-to-charge ratio from the mass spectrum array, and produces a mass image based on the ionic strength array. The mass image has an x axis and a y axis which are in an orthogonal relationship. The mass image is formed from a plurality of pixels. Each pixel has a pixel value (intensity value) corresponding to the ionic strength. Normally, a plurality of mass-to-charge ratios are designated, and a plurality of mass images corresponding to the plurality of mass-to-charge ratios are produced. A method of producing the mass image will be described in detail later with reference to FIG. 2.

The pre-processor 46 applies a pre-process to the mass image for which the image quality is to be converted (original mass image). As a result of the application of the pre-process, a model input image fitted to an input condition of the image quality converter 48 (an input condition of the image quality conversion model) is produced.

In an embodiment of the present disclosure, the pre-process includes intensity scaling (intensity conversion) and image size adjustment (image size manipulation). In addition, the pre-process includes a high intensity noise process, a low intensity noise process, or the like. With the pre-process, a model input image including an entirety or a part of a particular mass image is produced. Alternatively, as will be described below, a model input image including a plurality of mass images may be produced.

The image quality converter 48 is formed from, for example, the CNN, and has the image quality conversion model produced by the learner 24. An image quality conversion model 54 is transferred or transplanted from the learner 24 to the image quality converter 48. In the transfer or transplanting of the image quality conversion model 54, a network or a transportable recording medium may be utilized. Alternatively, the learner 24 and the image quality converter 48 may be integrated.

The image quality conversion model is originally for improving the image quality of the SEM image, but in the present embodiment, the image quality conversion model is used for improvement of the image quality of the mass image. While there are some differences between the SEM image and the mass image, the SEM image and the mass image are common with each other in that the images are both two-dimensional scanning images representing the sample surface. Effectiveness of application of the image quality conversion model for the SEM image to the mass image has been confirmed through experiments by the present inventors.

The post-processor 50 applies a post-process to a model output image which is output from the image quality converter 48. As a result of the application of the post-process, a mass image after image quality conversion which is fitted to a mass image output condition is produced.

In an embodiment of the present disclosure, the post-process includes a plurality of inverse conversions corresponding to the plurality of conversions included in the pre-process. More specifically, the post-process includes intensity scaling (intensity conversion) and image size adjustment (image size manipulation). The mass image after the image quality conversion corresponds to an entirety or a part of the model output image, or corresponds to a plurality of model output images. The pre-process and the post-process will be described later in detail with reference to FIGS. 3 to 8.

The display 52 displays a mass image after the image quality conversion; that is, a mass image with improved image quality. Alternatively, coloring process may be applied to the mass image. Alternatively, the mass image may be analyzed. The display 52 is formed from, for example, the LCD.

According to the mass image processing apparatus 36 shown in FIG. 1, under a situation in which the high-definition mass image cannot be acquired, the image quality of the mass image may be improved using a machine learning model.

Figure 2:
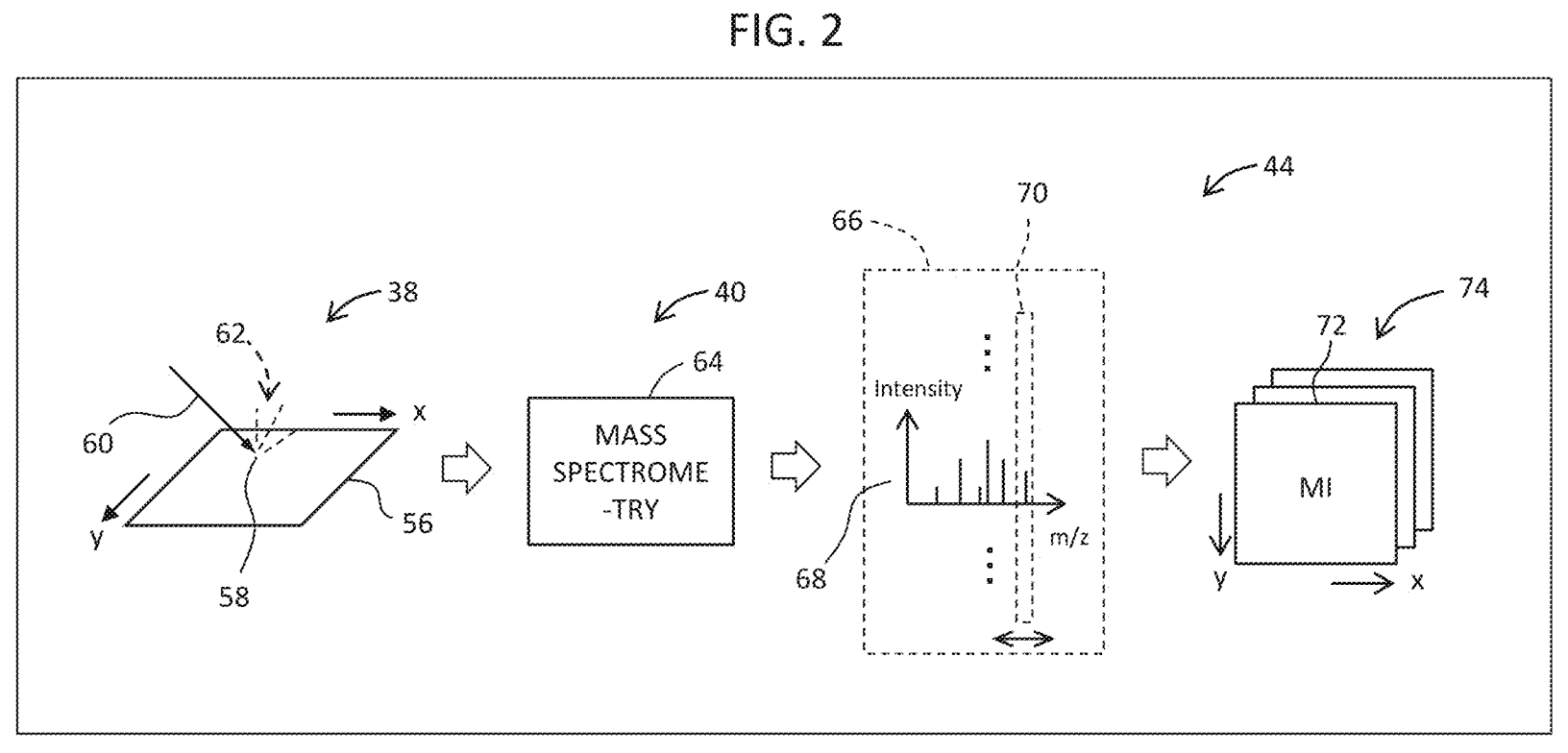

FIG. 2 shows a method of producing a mass image. Reference numeral 38 indicates the ion source, reference numeral 40 indicates the mass analyzer, and reference numeral 44 indicates the mass image generator. An observation area 56 is set for a sample. The observation area 56 is a two-dimensional area extending in the x direction and in the y direction. In the observation area 56, a beam 60 for ionization is two-dimensionally scanned. The beam 60 is a primary ion beam or a laser beam. The observation area 56 is formed from a plurality of micro areas 58 arranged in the x direction and the y direction. A position of each micro area 58 is specified by an x coordinate and a y coordinate. Ions 62 generated from each of the micro areas 58 are set as targets of mass spectrometry.

In the mass analyzer 40, mass spectrometry is performed on the ions 62 generated from each of the micro areas 58. As a result, a mass spectrum 68 is produced for each micro area 58. That is, a plurality of mass spectra 68 corresponding to the plurality of micro areas 58 are produced. A mass spectrum array 66 is formed from the plurality of mass spectra 68.

Based on a designated mass-to-charge ratio, an ionic strength array 70 which is a peak array is extracted from the mass spectrum array 66. The ionic strength array 70 is formed from a plurality of ionic strengths corresponding to the plurality of micro areas 58. The ionic strengths are two-dimensionally mapped, to produce a mass image 72. The mass image 72 is formed from a plurality of pixels. A position of each pixel is specified by an x coordinate and a y coordinate. A pixel value of each pixel corresponds to the ionic strength. Normally, a plurality of mass-to-charge ratios are designated, and a plurality of mass images corresponding to the plurality of mass-to-charge ratios are produced. A mass image set 74 is formed from a plurality of mass images. Each individual mass image 72 is set as a target of image quality conversion.

An amount of ions generated from each micro area 58 in the sample is small, and, furthermore, the amount of ions per each individual mass-to-charge ratio, among the amount of ions generated, is very small. In addition, during the process of the two-dimensional beam scan with respect to the sample, even if the compound of interest is uniformly distributed, a variation in the amount of ions generated tends to be caused. In particular, a sudden increase in the amount of ions tends to occur. In some cases, a sudden decrease in the amount of ions occurs. When using the MALDI method, in order to promote ionization, a matrix is sprayed or deposited over the surface of the sample. When a distribution of the matrix is not uniform, the amount of ions may vary due to the non-uniformity. Due to several reasons as those described above, it is difficult to produce a mass image having a superior S/N ratio. On the other hand, according to an embodiment of the present disclosure, the image quality of the mass image can be improved using an image quality conversion model produced externally. In the present embodiment, in order to handle the high intensity noise caused by the sudden increase in the amount of ions, a high intensity noise process is applied to the mass image, and, in order to handle the low intensity noise caused by the sudden decrease in the amount of ions, a low intensity noise process is applied to the mass image. With these processes, an input dynamic range of the image quality conversion model can be sufficiently utilized.

FIG. 3 shows a specific example structure of the mass image processing apparatus. The pre-processor 46 applies a pre-process to a mass image 76 which is input (original mass image), to produce a model input image 84. The pre-process is applied to the mass image 76 such that the model input image 84 satisfies an input condition of the image quality conversion model. In the illustrated example structure, the pre-processor 46 has a noise processor 78, an input-side scaling device 80, and a model input image producer 82.

The noise processor 78 applies the high intensity noise process and the low intensity noise process to the mass image 76. The high intensity noise process is a process to correct or remove the high intensity noise included in the mass image. Alternatively, a pixel value corresponding to the high intensity noise may be downward-revised (suppressed) to a predetermined pixel value. A pixel value satisfying a high intensity condition is the high intensity noise. For example, in an intensity distribution serving as a pixel value histogram, pixel values belonging to a portion of an upper k1% are judged as the high intensity noise. The value of k1 is, for example, a numerical value within a range of 0.1%~5%.

The low intensity noise process is a process to correct or remove low intensity noise included in the mass image. Alternatively, a pixel value corresponding to the low intensity noise may be upward-revised (raised) to a predetermined pixel value. A pixel value satisfying a low intensity condition is the low intensity noise. For example, in the intensity distribution, pixel values belonging to a portion of lower k2% are judged as the low intensity noise. The value of k2 is, for example, a numerical value within a range of 0.1%~5%.

The input-side scaling device 80 applies scaling (intensity conversion) to the mass image after the noise processes, such that the intensity distribution of the mass image after the noise processes (corrected intensity distribution) fits to an intensity condition of the image quality conversion model (first intensity condition); that is, an input dynamic range. By executing the scaling after the noise processes, it is possible to sufficiently utilize the input dynamic range of the image quality conversion model.

The model input image producer 82 produces the model input image such that a size of the model input image fits to an image size condition of the image quality conversion model (first image size condition). The model input image producer 82 may alternatively be called an image size manipulator or an image size adjuster. In production of the model input image, a plurality of mass images which may be the same or different may be spatially connected, or an entirety or a part of one mass image may be used. In the pre-processor 46, the mass image may be enlarged or reduced in size.

In an embodiment of the present disclosure, the scaling is first executed, and then, the size adjustment is executed. Alternatively, the size adjustment may be first executed and the scaling may then be executed.

As already described, the image quality converter 48 has the image quality conversion model which is introduced from the outside. The image quality conversion model applies image quality conversion to the model input image 84, to produce a model output image 86. The image quality conversion model in an embodiment of the present disclosure realizes a function to convert a rough image to a fine image, without losing an imaged structure or pattern.

The post-processor 50 applies a post-process to the model output image 86 which is input, to produce a mass image 92 after image quality conversion. The post-process is applied to the model output image 86 such that the mass image 92 after the image quality conversion satisfies a mass image output condition. In the illustrated example structure, the post-processor 50 has an output-side scaling device 88, and a model output image treatment device 90.

The output-side scaling device 88 executes scaling (intensity conversion) on the intensity distribution of the model output image 86 such that the mass image 92 after the conversion satisfies an intensity condition (second intensity condition). With this process, the intensity distribution of the mass image 92 after the image quality conversion can be set to be more natural.

The model output image treatment device 90 applies a treatment on the model output image 86 to produce the mass image 92 after the image quality conversion, such that the mass image 92 after the image conversion satisfies an image size condition (second image size condition). The concept of "treatment" includes cutting out and the like. Alternatively, a plurality of partial images that are cut out may be accumulated.

In an embodiment of the present disclosure, the image treatment is first executed, and then the scaling is executed. Alternatively, the scaling may be first executed and the image treatment may then be executed. In the post-process, magnification of the image may be changed.

FIG. 4 shows an intensity distribution 94 of the mass image which is input to the pre-processor. The horizontal axis is an intensity axis, and the vertical axis shows frequency (number of pixels). In the high intensity noise process, a portion 94*a* corresponding to the upper k1% in the intensity distribution 94 is identified (refer to reference numeral 96). A lower limit intensity of the portion 94*a* is TH1. All of the pixel values belonging to the portion 94*a* are downward-revised to, for example, TH1 (or a value based thereon). In the low intensity noise process, a portion 94*b* corresponding to the lower k2% in the intensity distribution 94 is identified (refer to reference numeral 98). An upper limit intensity of the portion 94*b* is TH2. All of the pixel values belonging to the portion 94*b* are upward-revised to, for example, TH2 (or a value based thereon).

As a result of the high intensity noise process and the low intensity noise process, the portion in the intensity distribution 94 which is sent to the image quality conversion model is an intermediate portion or a primary portion 94*c* (refer to reference numeral 100). Because the intensity conversion range can be limited by removing the portions corresponding to the noises, the input dynamic range of the image quality conversion model can be utilized to the maximum degree. Alternatively, only one of the high intensity noise process and the low intensity noise process may be executed. Alternatively, other noise processes may be applied.

FIG. 5 exemplifies a plurality of intensity conversions which are executed stepwise. An original intensity axis 100 is an intensity axis of the mass image for which the image quality conversion is executed. The intensity distribution of the mass image exists on the original intensity axis 100. The maximum value of the intensity after the noise process is expressed as Amax, and the minimum value of the intensity after the noise process is expressed as Amin. Reference numeral 100A shows a possible range of intensities on the original intensity axis 100.

A converted space intensity axis 102 is an intensity axis of the image quality conversion model. Reference numeral 102A shows a possible range of intensities on the converted space intensity axis 102, and corresponds to the input dynamic range (and an output dynamic range). In the range 102A, the maximum value of the intensity is expressed as Bmax, and the minimum value of the intensity is expressed as Bmin.

In the input-side scaling, a conversion condition is determined such that the maximum value Amax is converted to the maximum value Bmax, and the minimum value Amin is converted to the minimum value Bmin. In an embodiment of the present disclosure, the input-side scaling is a linear conversion, but alternatively, a nonlinear conversion may be employed in place of the linear conversion.

An intensity distribution of the mass image after the image quality conversion exists on an output intensity axis 104. Reference numeral 104A shows a possible range of the intensities on the output intensity axis 104. In the range 104A, the maximum value of the intensity corresponding to the maximum value of the intensity Bmax described above is expressed as Cmax, and the minimum value of the intensity corresponding to the minimum value of the intensity Bmin described above is expressed as Cmin.

In the output-side scaling, a conversion condition is determined such that the maximum value Bmax is converted to the maximum value Cmax, and the minimum value Bmin is converted to the minimum value Cmin. In an embodiment of the present disclosure, the output-side scaling is a linear conversion, but alternatively, a nonlinear conversion may be employed in place of the linear conversion.

For example, an intensity 106 of a particular pixel in the mass image is converted to an intensity 108 by the input-side scaling. With the image quality conversion, the intensity 108 is converted to an intensity 112 (refer to reference numeral

110). The intensity 112 is converted to an intensity 114 by the output-side scaling. The process shown in FIG. 5 is merely exemplary, and other processes may be executed.

Next, the production of the model input image and the treatment of the model output image will be described with reference to FIGS. 6 to 8.

Figure 6:
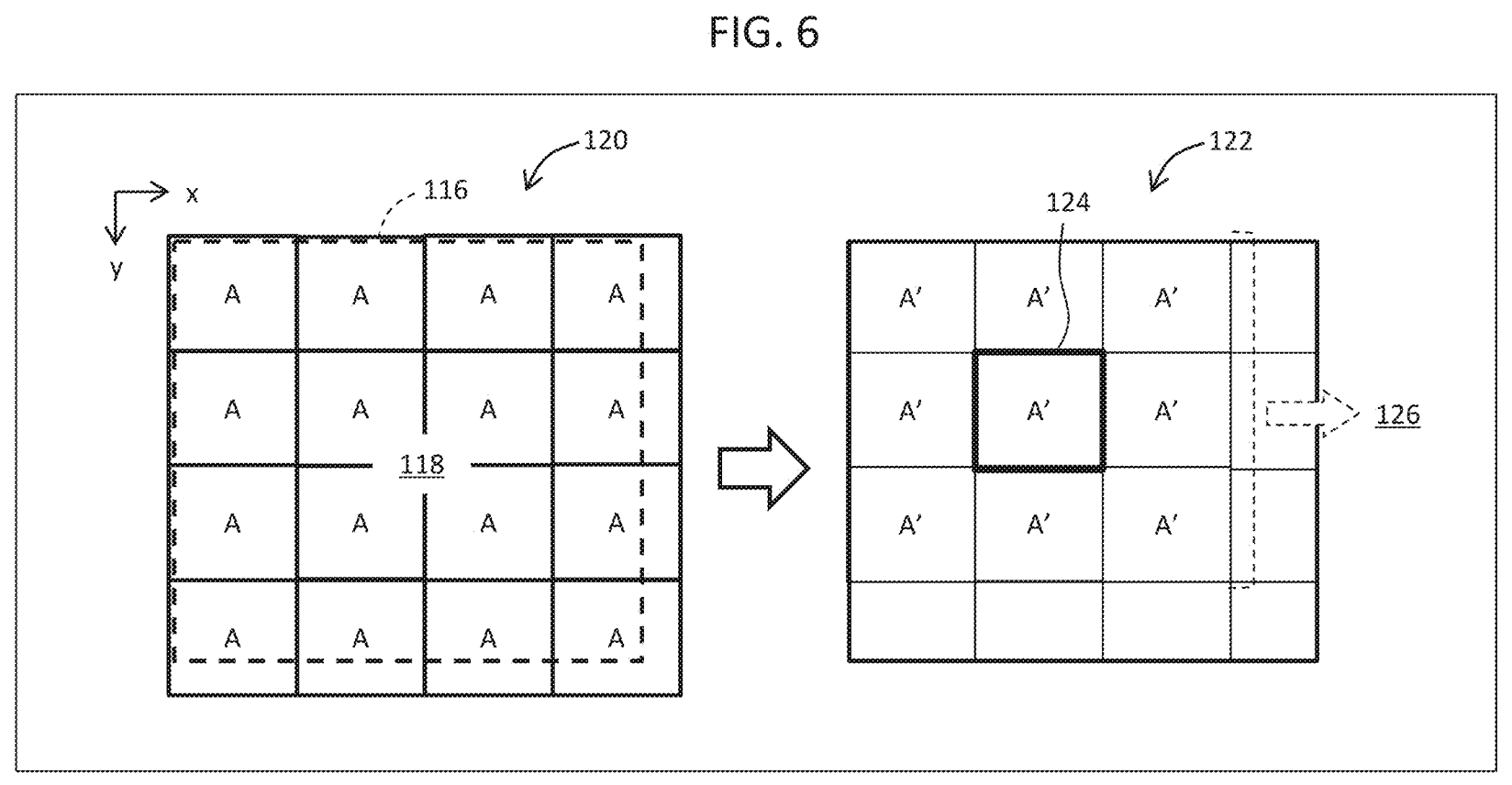

In a first example shown in FIG. 6, reference numeral 116 indicates a standard size of a model input image 120. In order to produce the model input image 120, a plurality of mass images A having the same contents are two-dimensionally arranged, and a mass image array 118 is consequently formed. A number of the mass images A forming the mass image array 118 is determined such that an outer frame size exceeding the standard size 116 is realized. In other words, the mass image array 118 is formed such that no blank is input to the image quality conversion model. From the mass image array 118, the model input image 120 having the standard size 116 is cut out. The model input image 120 which is cut out is supplied to the image quality conversion model. Here, the mass image A is an image after the input-side scaling, but alternatively, the input-side scaling may be executed after the cutting-out process described above.

A model output image 122 includes a plurality of mass images A' after the image quality conversion. From these mass images, a particular mass image A' is cut out. The mass image A' is output as the mass image after the image quality conversion. The output-side scaling is executed after the cutting-out process. Alternatively, a plurality of mass images A' may be cut out from the model output image 122, and may be accumulated (or averaged) (refer to reference numeral 126). In this case, the accumulated image is output as the mass image after the image quality conversion.

Figure 7:
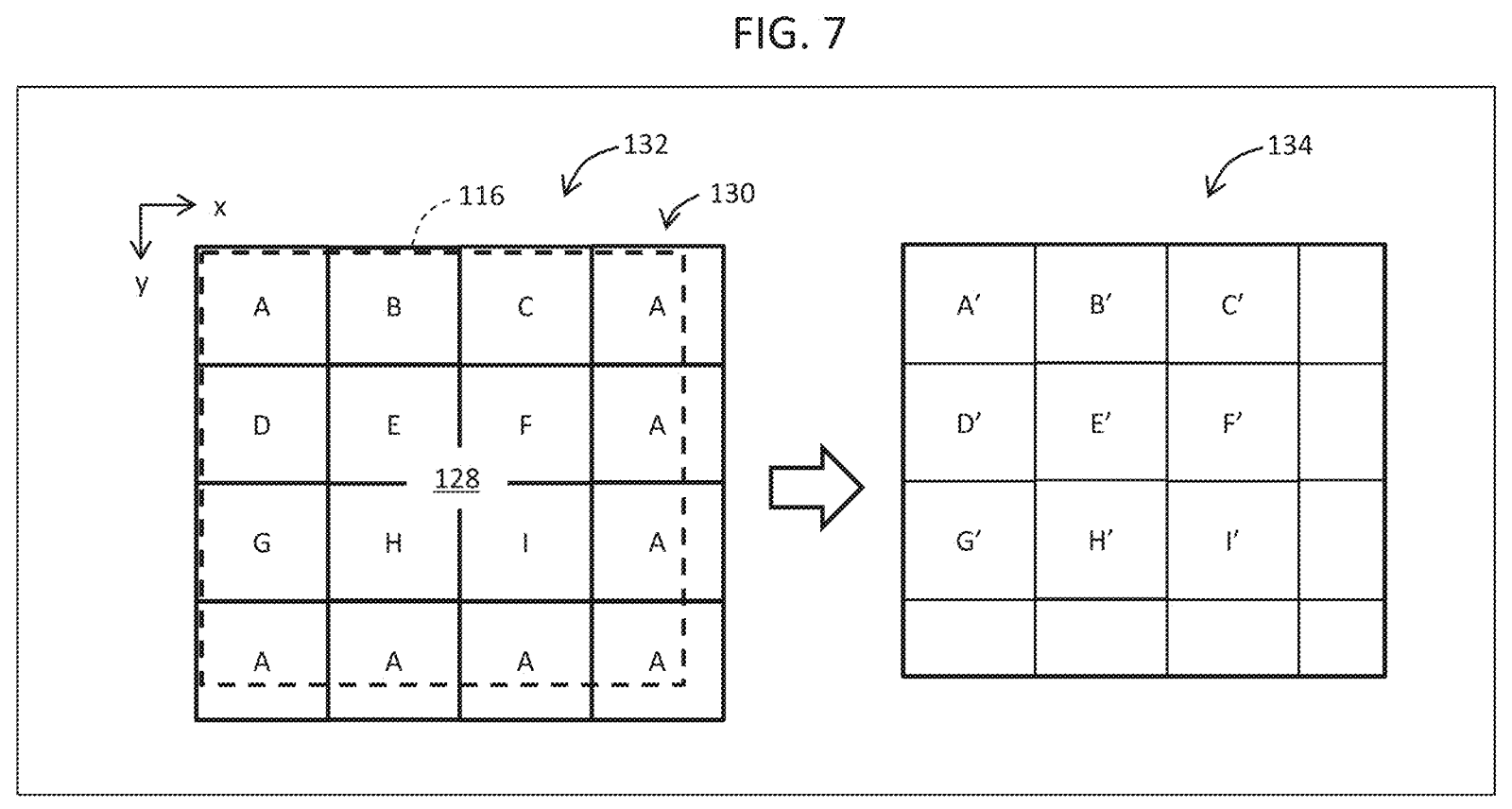

In a second example shown in FIG. 7, in production of a model input image 132, a plurality of mass images A~I which differ from each other are two-dimensionally arranged, and a mass image array 128 is consequently formed. A number of mass images forming the mass image array 128 is determined such that an outer frame size exceeding the standard size 116 is realized. In order to prevent generation of a gap 130 within the standard size 116, the gap 130 is filled by, for example, a plurality of mass images A. A model input image 132 having the standard size 116 is cut out from the mass image array 128. The model input image 132 which is cut out is supplied to the image quality conversion model. Similar to the above, while the mass images A~I are images after the input-side scaling, alternatively, the input-side scaling may be executed after the cutting-out process described above.

A model output image 134 includes a plurality of mass images A'~I' after the image quality conversion. These mass images A'~I' are individually cut out, and each of these mass images A'~I' are output as the mass image after the image quality conversion. After the cutting-out process, the output-side scaling is executed. According to the second example, a plurality of mass images can be processed simultaneously.

Figure 8:
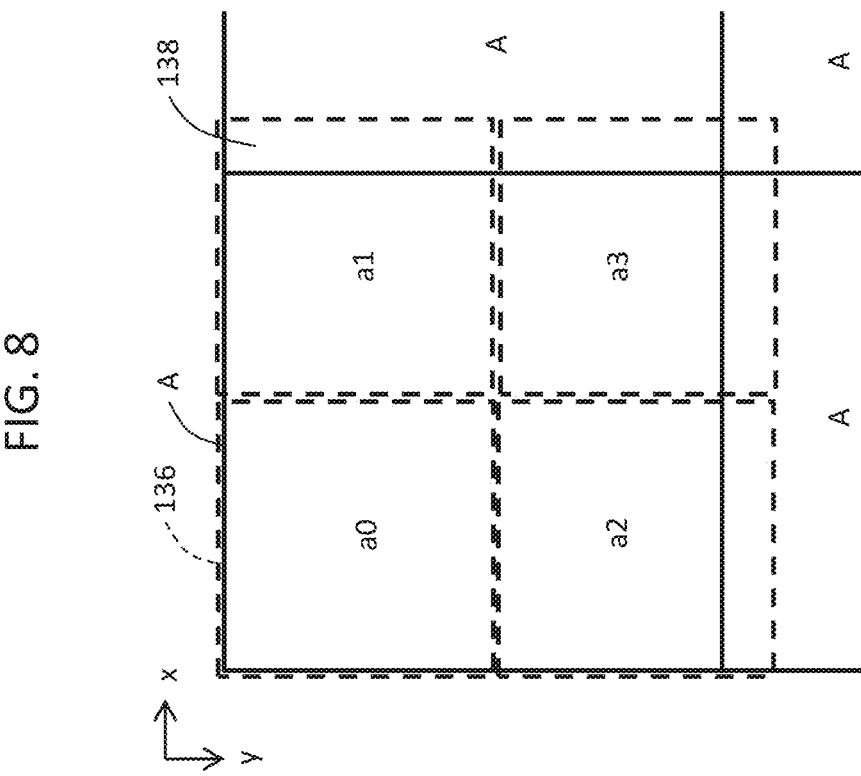
FIG. 8 is a diagram showing a third example of the input-side image manipulation.

In a third example shown in FIG. 8, a standard size 136 of the model input image is smaller in comparison to the size of the mass image A. In such a case, portions a0, a1, a2, and a3 in the mass image A are sequentially cut out as the model input image. In order to prevent generation of a gap 138 in the image quality conversion of the portions a1, a2, and a3, other portions of the mass image A are used. For example, as shown in FIG. 8, a plurality of mass images A having the same contents are two-dimensionally arranged to form a mass image array, and each model input image which is cut out from the mass image array is sent to the image quality conversion model.

Figure 9:
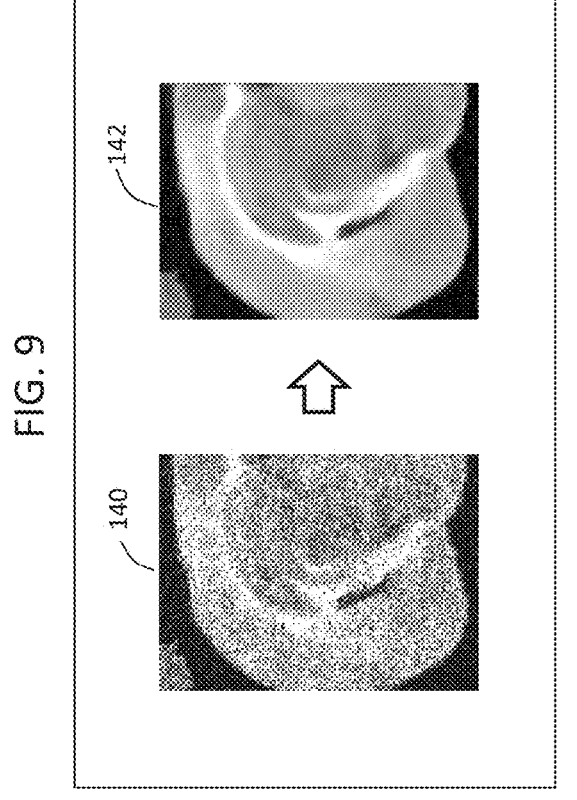
FIG. 9 is a diagram showing a first example conversion.

FIG. 9 shows a first example of the image quality conversion. In a mass image 140 before the image quality conversion, roughness is prominent. A mass image 142 after the image quality conversion is a smooth image. The structure or the edge is preserved before and after the image quality conversion. In fact, the structure or the edge is clarified or emphasized after the image quality conversion.

Figure 10:
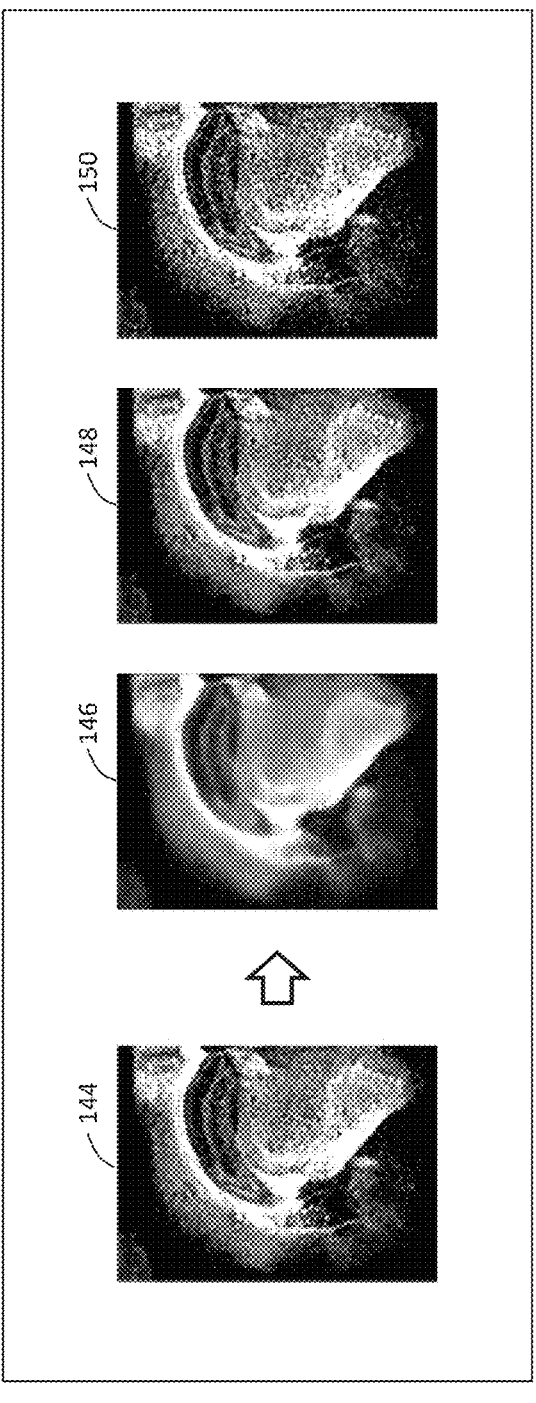
FIG. 10 is a diagram showing a second example conversion.

FIG. 10 shows a second example of the image quality conversion. A mass image 144 before the image quality conversion is a rough image. Reference numeral 146 shows a mass image after the image quality conversion when no enlargement is performed in the pre-process. This image is a fine image. Reference numeral 148 shows a mass image after the image quality conversion in the case in which enlargement of 4 times (2 times in the x direction and 2 times in the y direction) is applied in the pre-process. Reference numeral 150 shows a mass image after the image quality conversion in the case in which enlargement of 9 times (3 times in the x direction and 3 times in the y direction) is applied in the pre-process. When the magnification is increased, the image quality after the conversion changes.

Figure 11:
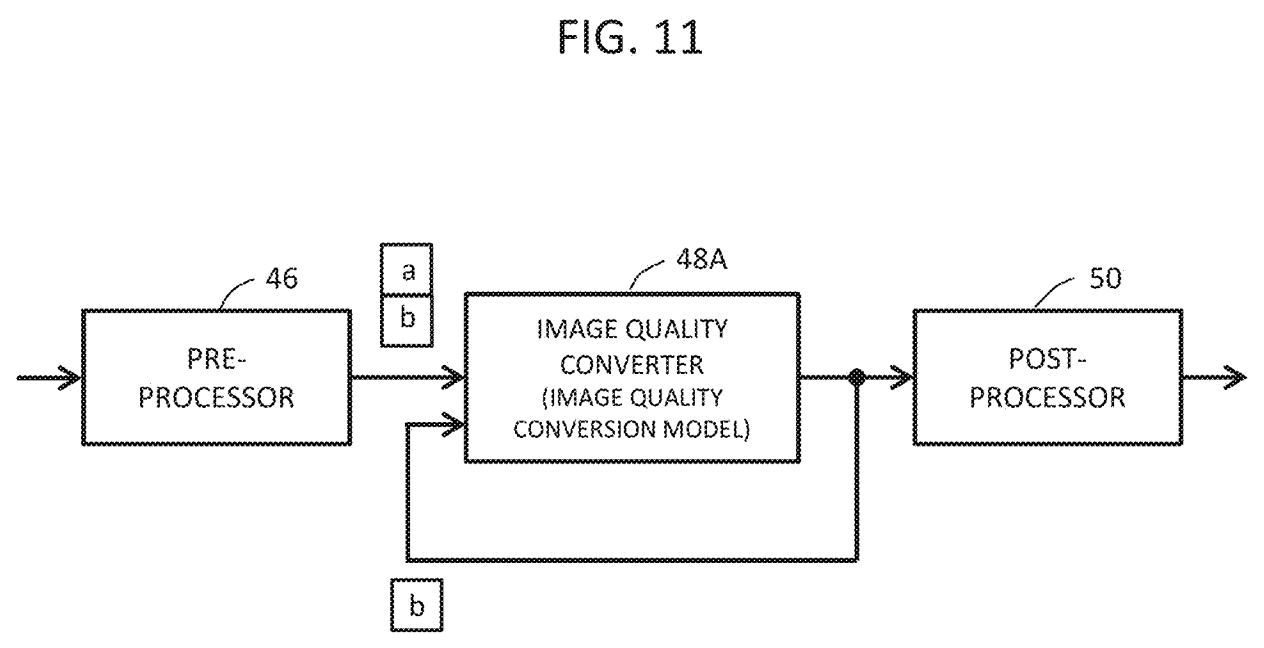

FIG. 11 shows an alternative configuration. An image quality converter 48A is provided between the pre-processor 46 and the post-processor 50. The image quality converter 48A has an image quality conversion model. When a model input image a is supplied to the image quality conversion model, a model output image b is produced. An image pair formed from the model input image a and the model output image b is used as training data. A large number of sets of training data are prepared, and relearning of the image quality conversion model using these training data is executed. When the image quality conversion model has a plurality of layers, a portion of the layers (for example, a portion of layers near the output layer) may be set as a target of the relearning. In this case, the contents of layers other than the portion of the layers are fixed or maintained.

In the system shown in FIG. 1, the scanning electron microscope system may be omitted. In this case, an SEM image of high definition may be provided from an SEM image database to the training data producer. Alternatively, the image quality converter may incorporate an image quality conversion model produced through machine learning based on a plurality of images acquired through laser shape measurement, or an image quality conversion model produced through machine learning based on a plurality of images captured by a camera.

The invention claimed is:

1. A mass image processing apparatus comprising:
a producer configured to produce an original mass image of a sample based on a plurality of ionic strengths extracted from a plurality of mass spectra obtained from the sample;
a pre-processor configured to apply a pre-process to the original mass image produced through mass spectrometry of the sample, to produce a model input image;
a converter that has an image quality conversion model for improving an image quality of the original mass image of the sample, the image quality conversion model produced through machine learning based on a group of images produced through sample analysis different from the mass spectrometry, and the image quality conversion model configured to produce a model output image through image quality conversion of the model input image; and a post-processor configured to apply a post-process to the model output image, to produce a mass image after image quality conversion, wherein
the pre-process is a process to fit the model input image with respect to an input condition of the converter, and
the post-process is a process to fit the mass image after the image quality conversion with respect to a mass image output condition.

2. The mass image processing apparatus according to claim 1, wherein
the input condition of the converter comprises an intensity condition, and
the pre-process comprises intensity scaling to fit an intensity distribution of the original mass image to the intensity condition.

3. The mass image processing apparatus according to claim 2, wherein
the pre-process further comprises a high intensity noise process to correct or remove a pixel value which satisfies a high intensity condition in the original mass image, and
the pre-processor executes the intensity scaling after execution of the high intensity noise process.

4. The mass image processing apparatus according to claim 3, wherein
the pre-process further comprises a low intensity noise process to correct or remove a pixel value which satisfies a low intensity condition in the original mass image, and
the pre-processor executes the intensity scaling after execution of the high intensity noise process and the low intensity noise process.

5. The mass image processing apparatus according to claim 1, wherein
the original mass image is an image produced through ion beam scanning or laser scanning with respect to the sample,
the different sample analysis is sample observation by a scanning electron microscope, and
the group of images are produced by the scanning electron microscope.

6. A mass image processing apparatus comprising:
a pre-processor configured to apply a pre-process to an original mass image produced through mass spectrometry of a sample, to produce a model input image;
a converter that has an image quality conversion model produced through machine learning based on a group of images produced through sample analysis different from the mass spectrometry, and is configured to produce a model output image through image quality conversion of the model input image; and
a post-processor configured to apply a post-process to the model output image, to produce a mass image after image quality conversion, wherein
the pre-process is a process to fit the model input image with respect to an input condition of the converter, and
the post-process is a process to fit the mass image after the image quality conversion with respect to a mass image output condition, wherein
the input condition of the converter comprises a first intensity condition and a first image size condition,
the mass image output condition comprises a second intensity condition and a second image size condition,
the pre-process comprises input-side intensity scaling to fit an intensity distribution of the original mass image with respect to the first intensity condition, and an input-side image manipulation to produce the model input image comprising an entirety or a part of the original mass image such that the first image size condition is satisfied, and the post-process comprises output-side intensity scaling to fit an intensity distribution of the model output image with respect to the second intensity condition, and an output-side image manipulation to produce the mass image after the image quality conversion including an entirety or a part of the model output image such that the second image size condition is satisfied.

7. A method of processing a mass image, the method comprising:

producing an original mass image of a sample based on a plurality of ionic strengths extracted from a plurality of mass spectra obtained from the sample;

applying a pre-process to the original mass image produced through mass spectrometry of the sample, to produce a model input image;

producing a model output image from the model input image using an image quality conversion model for improving an image quality of the original mass image of the sample, the image quality conversion model produced through machine learning based on a group of images produced through sample analysis different from the mass spectrometry; and applying a post-process to the model output image, to produce a mass image after image quality conversion, wherein the pre-process is a process to fit the model input image with respect to an input condition of the image quality conversion model, and the post-process is a process to fit the mass image after the image quality conversion with respect to a mass image output condition.

8. A non-transitory computer-readable storage medium storing a program which, when executed, causes an information processing apparatus to execute a mass image process, the mass image process comprising:

producing an original mass image of a sample based on a plurality of ionic strengths extracted from a plurality of mass spectra obtained from the sample;

applying a pre-process to the original mass image produced through mass spectrometry of the sample, to produce a model input image;

producing a model output image from the model input image using an image quality conversion model for improving an image quality of the original mass image of the sample, the image quality conversion model produced through machine learning based on a group of images produced through sample analysis different from the mass spectrometry; and applying a post-process to the model output image, to produce a mass image after image quality conversion, wherein the pre-process is a process to fit the model input image with respect to an input condition of the image quality conversion model, and the post-process is a process to fit the mass image after the image quality conversion with respect to a mass image output condition.

* * * * *